(12) United States Patent
Jane Santamaria

(10) Patent No.: US 7,467,825 B2
(45) Date of Patent: Dec. 23, 2008

(54) BASE FOR FITTING INFANT SEATS TO MOTORCARS

(75) Inventor: Manuel Jane Santamaria, Palau Solita I Plegamans (ES)

(73) Assignee: Jane, S.A., Barcelona (ES)

( * ) Notice: Subject to any disclaimer, the term of this patent is extended or adjusted under 35 U.S.C. 154(b) by 0 days.

(21) Appl. No.: 11/827,212

(22) Filed: Jul. 11, 2007

(65) Prior Publication Data
US 2008/0012408 A1   Jan. 17, 2008

(30) Foreign Application Priority Data
Jul. 14, 2006   (ES) ............................. 200601679 U

(51) Int. Cl.
*B60N 2/26* (2006.01)

(52) U.S. Cl. .................................. 297/253; 297/256.16

(58) Field of Classification Search ................. 297/253, 297/252, 256.16, 463.1, 463.2, 250.1; 248/503, 248/503.1
See application file for complete search history.

(56) References Cited

U.S. PATENT DOCUMENTS

| | | | |
|---|---|---|---|
| 4,787,675 A * | 11/1988 | McLeod | 297/335 |
| 5,397,111 A * | 3/1995 | Knopp et al. | 267/64.12 |
| 5,466,044 A * | 11/1995 | Barley et al. | 297/252 |
| 6,764,135 B2 * | 7/2004 | Sasaki et al. | 297/256.16 |
| 2007/0069562 A1 * | 3/2007 | Van Montfort et al. | 297/253 |

* cited by examiner

*Primary Examiner*—Milton Nelson, Jr.
(74) *Attorney, Agent, or Firm*—Merchant & Gould P.C.

(57) ABSTRACT

A base includes an anchor being operable to engage a receiving element provided in a motorcar. The anchor is actuated by a pneumatic device being in its turn actuated by a control provided at the base. The pneumatic device and a control, made up by an articulated lever, are fitted to a framework. A piston of the pneumatic device is fitted to a transversal carrier of the anchor by the head in a freely rotatable manner housing the transversal carrier. The framework at each of its sides has a respective guide along which the transversal carrier is shiftable, and supports for the fitting of the infant seat, the framework being mounted on a platform.

6 Claims, 1 Drawing Sheet

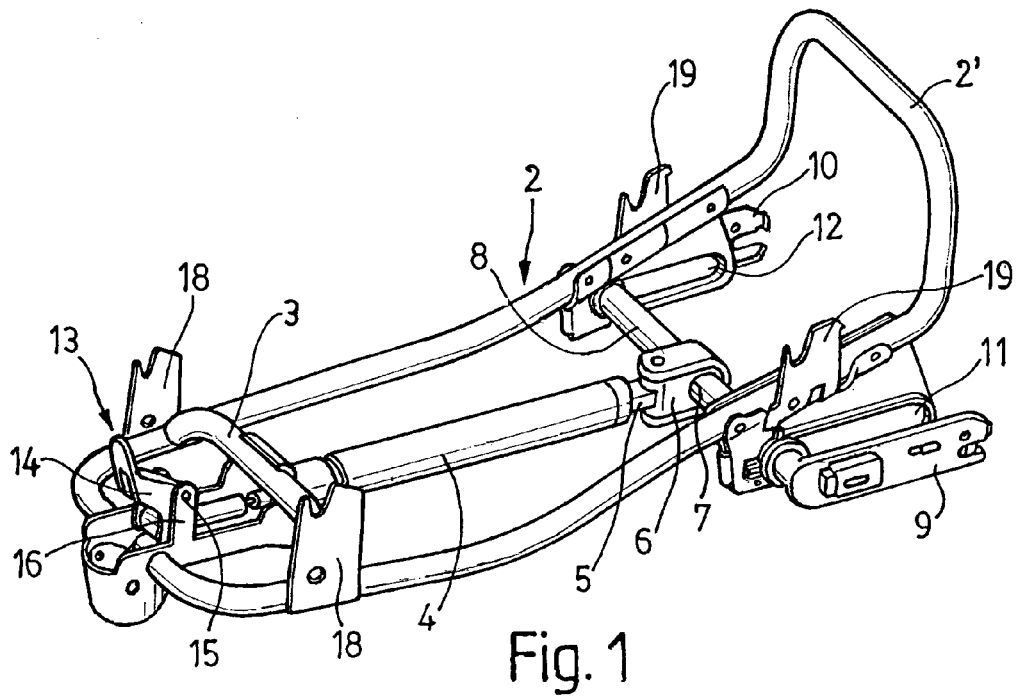
Fig. 1
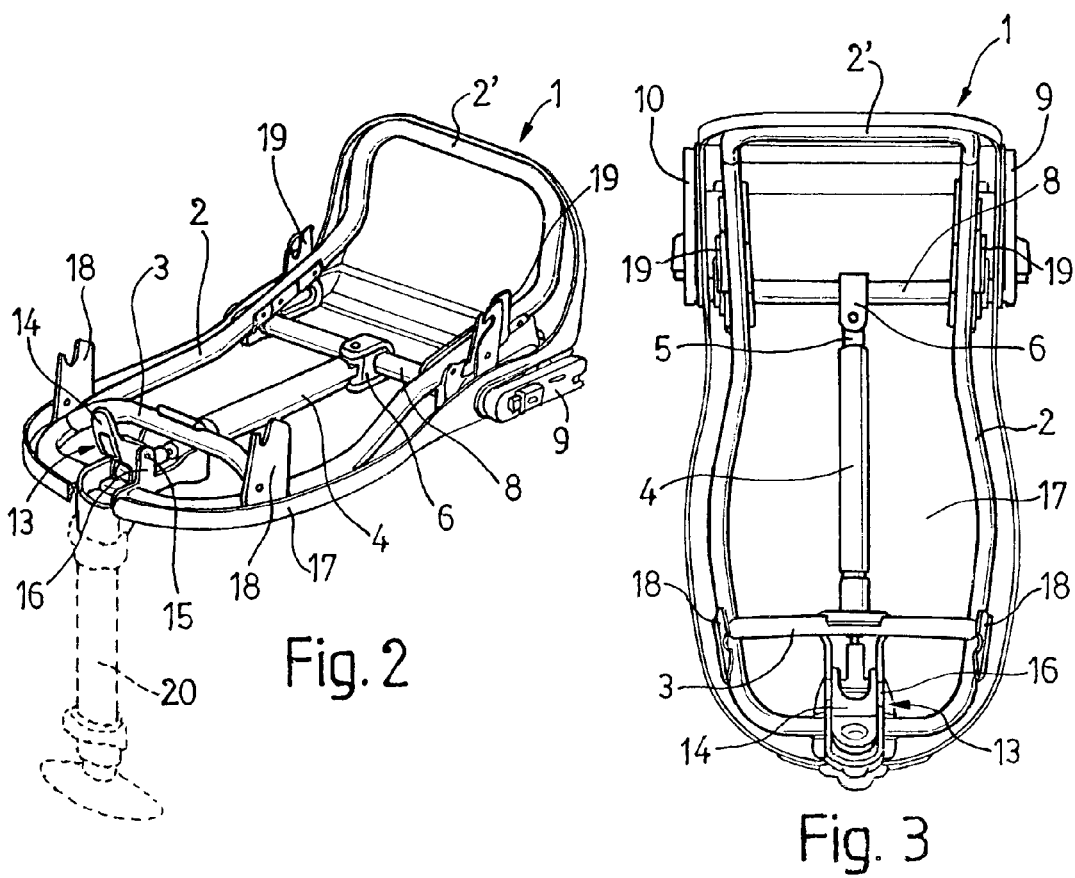
Fig. 2
Fig. 3

BASE FOR FITTING INFANT SEATS TO MOTORCARS

BACKGROUND OF THE INVENTION

There exist several means for securely fitting the infant seats to the motorcars, from among them being known the mechanical connectors being made up by two anchoring elements being fitted to the base of the seat and arranged in a backwardly projecting arrangement, said anchoring elements being designed to engage an element being solid with the motorcar, from among the aforementioned mechanical connectors there existing those being known as of the "isofix" type.

SUMMARY OF THE INVENTION

This invention has as its object a base for fitting infant seats to motorcars, wherein the anchoring means of the "isofix" type are used in which the mechanisms being provided for actuating said means are replaced by a pneumatic device thus eliminating the complexity of said devices and avoiding the problems that could possibly arise during their operation and obtaining a simplification resulting in a benefit from both the operational and the financial point of view.

This base comprises a framework being fitted with the pneumatic device and the control for actuating this latter, said control being made up by an articulated lever.

The piston of the pneumatic device is fitted to the transversal carrier of the anchoring means by means of a head in which said transversal carrier is freely rotatable, this latter being shiftable along guides being provided at the sides of the framework.

These and other characterizing features will be best made apparent by the following detailed description whose understanding will be made easier by the accompanying sheet of drawings showing a practical embodiment being cited only by way of example not limiting the scope of the present invention.

BRIEF DESCRIPTION OF THE DRAWINGS

In the drawings:

FIG. 1 shows in a perspective view the framework with all its active components, and FIGS. 2 and 3 illustrate the complete base in a perspective and a plan view, respectively.

DETAILED DESCRIPTION OF THE PREFERRED EMBODIMENT(S) DETAILED DESCRIPTION

According to the drawings the base (1) for fitting infant seats to motorcars comprises a framework (2) being made up by a substantially rectangular frame with a bent up rear length (2'). A cross member (3) is securely attached to the front portion of the framework (2) and has the end of a pneumatic device fitted to it, the piston (5) of said pneumatic device ending in a head (6) having an orifice (7) in a freely rotatable manner housing a transversal carrier (8) having fitted to each of its ends respective anchoring means (9) and (10) of the "isofix" type comprising a locking mechanism being operable to engage a metal rod being solid with the motorcar.

This transversal carrier (8) is shiftable along respective guides (11) and (12) being provided at the sides of the framework (2).

The actuation of the pneumatic device (4) is carried out by means of a control (13) being made up by a lever (14) being articulately linked at an intermediary point (15) to a support (16) being solid with the framework (2).

The framework (2) is mounted on an angular platform (17) and at each side comprises two supports (18) and (19) for the fitting of the infant seat.

The base (1) is completed with the conventional leg (20) frontally propping it on the floor of the motorcar, said leg generally being a telescopic one. The pneumatic device will be preferably made up by a lockable gas spring.

The invention claimed is:

1. A base for fitting infant seats to motorcars comprising:
   anchoring means operable to engage a receiving element provided in the motorcar, wherein the anchoring means are actuated by a pneumatic device, and wherein the pneumatic device is actuated by an articulated lever provided at said base;
   a framework having opposed sides, wherein the framework includes a guide along each side, and wherein the pneumatic device and articulated lever are connected to the framework;
   a transversal carrier engaging each guide and shifting along each guide.

2. A base for fitting infant seats to motorcars, as per claim 1, wherein the pneumatic device comprises a lockable gas spring.

3. A base for fitting infant seats to motorcars, as per claim 1, wherein a piston of a pneumatic device is fitted to a transversal carrier of the anchoring means by a head in a freely rotatable manner housing the transversal carrier.

4. A base for fitting infant seats to motorcars, as per claim 1, wherein the framework is mounted on a platform.

5. A base for fitting infant seats to motorcars, as per claim 1, wherein the framework at each side comprises supports for fitting of the infant seat.

6. A base for fitting infant seats to motorcars comprising:
   anchoring means operable to engage a receiving element provided in the motorcar, the anchoring means including a transversal carrier;
   a pneumatic device having the piston, wherein a pneumatic device actuates the anchoring means, and wherein the pneumatic device is actuated by a control provided at the base; and
   wherein the piston of the pneumatic device is fitted to the transversal carrier by a head in a freely rotatable manner housing the transversal carrier.

* * * * *